United States Patent
Sawada et al.

(10) Patent No.: US 8,801,196 B2
(45) Date of Patent: Aug. 12, 2014

(54) MULTI-SCREEN DISPLAY APPARATUS THAT DETERMINES COMMON TARGET BRIGHTNESS FOR CONTROLLING MULTIPLE LIGHT SOURCES

(75) Inventors: Kiyoshi Sawada, Tokyo (JP); Yoshinori Asamura, Tokyo (JP); Isao Yoneoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 254 days.

(21) Appl. No.: 13/327,963

(22) Filed: Dec. 16, 2011

(65) Prior Publication Data

US 2012/0182485 A1 Jul. 19, 2012

(30) Foreign Application Priority Data

Jan. 17, 2011 (JP) .................... 2011-006724

(51) Int. Cl.
| | | |
|---|---|---|
| G03B 21/26 | (2006.01) | |
| G09G 5/00 | (2006.01) | |
| H05B 37/02 | (2006.01) | |
| H05B 39/04 | (2006.01) | |
| H05B 41/36 | (2006.01) | |
| H04N 3/22 | (2006.01) | |

(52) U.S. Cl.
USPC ............... 353/94; 345/1.1; 345/1.2; 345/1.3; 315/291; 348/745

(58) Field of Classification Search
USPC ............... 353/94; 345/1.1, 1.2, 1.3; 315/291; 348/745
See application file for complete search history.

(56) References Cited

U.S. PATENT DOCUMENTS

| | | | |
|---|---|---|---|
| 5,396,257 A | 3/1995 | Someya et al. | |
| 6,300,931 B1 | 10/2001 | Someya et al. | |
| 7,423,626 B2 * | 9/2008 | Yamamoto et al. | 345/102 |
| 7,940,013 B2 * | 5/2011 | Nakao | 315/291 |
| 2001/0013843 A1 * | 8/2001 | Fujiwara et al. | 345/1.2 |
| 2005/0058450 A1 | 3/2005 | Yamamoto et al. | |
| 2005/0219271 A1 * | 10/2005 | Tanaka | 345/690 |
| 2010/0067788 A1 | 3/2010 | Kondo et al. | |

FOREIGN PATENT DOCUMENTS

| | | |
|---|---|---|
| CN | 1310838 A | 8/2001 |
| CN | 1595254 A | 3/2005 |
| CN | 101673523 A | 3/2010 |
| JP | 10-90645 A | 4/1998 |
| JP | 11-296127 A | 10/1999 |
| JP | 2000-163007 A | 6/2000 |
| JP | 3287007 B2 | 5/2002 |
| JP | 2004-341282 A | 12/2004 |

(Continued)

*Primary Examiner* — Georgia Y Epps
*Assistant Examiner* — Magda Cruz
(74) *Attorney, Agent, or Firm* — Birch, Stewart, Kolasch & Birch, LLP (57) ABSTRACT

A multi-screen display apparatus is a multi-screen display apparatus in which screens of a master apparatus and slave apparatuses are arranged. Each of the master apparatus and the slave apparatuses includes a light source for three primary colors formed of a semiconductor light emitting element, and a memory circuit for storing a brightness corresponding to a control current that is specific to each of the primary colors of the light source. The master apparatus determines a common target brightness based on the brightness outputtable by the master apparatus itself and the brightnesses outputtable by other apparatuses. Each of the master apparatus and the slave apparatuses reads, as a target control current, the control current corresponding to the target brightness from the memory circuit, and supplies the target control current to the light source.

5 Claims, 8 Drawing Sheets

(56) References Cited

FOREIGN PATENT DOCUMENTS

| JP | 2005-17324 A | 1/2005 |
|---|---|---|
| JP | 2006-292914 A | 10/2006 |
| JP | 2007-147852 A | 6/2007 |
| JP | 2007-310008 A | 11/2007 |
| JP | 2007-322945 A | 12/2007 |
| JP | 2008-151838 A | 7/2008 |
| JP | 2008-185924 A | 8/2008 |
| JP | 2009-69597 A | 4/2009 |
| JP | 2009-109956 A | 5/2009 |
| JP | 2010-91596 A | 4/2010 |
| JP | 2011-85693 A | 4/2011 |

* cited by examiner

FIG. 10

MULTI-SCREEN DISPLAY APPARATUS THAT DETERMINES COMMON TARGET BRIGHTNESS FOR CONTROLLING MULTIPLE LIGHT SOURCES

BACKGROUND OF THE INVENTION

1. Field of the Invention

The present invention relates to a multi-screen display apparatus having screens of a plurality of projection type video image display apparatuses arranged, and particularly relates to the one capable of suppressing non-uniformity of the brightness among the plurality of projection type video image display apparatuses.

2. Description of the Background Art

Examples of an apparatus that displays a video image on a large screen include a multi-screen display apparatus having screens of a plurality of projection type video image display apparatuses arranged. As a light source of the projection type video image display apparatus included in the multi-screen display apparatus, for example, a high-voltage discharge lamp or an LED (Light Emitting Diode) that is a semiconductor light emitting element is adopted. In some cases, however, due to a variation during a process of manufacturing these devices, the plurality of projection type video image display apparatuses may exhibit non-uniform brightnesses. Presence of such non-uniformity of the brightness causes a conspicuous difference in the brightness among the screens, which may spoil a sense of unity of the large screen.

Therefore, conventionally, after installation of the multi-screen display apparatus, the brightness has been adjusted such that the screens have the same brightness based on a visual observation, or non-uniformity of the brightness has been suppressed based on an adjustment value obtained by using a measuring instrument such as a luminance meter. Such a technique is disclosed in, for example, Japanese Patent No. 3287007.

However, in a case where an operator adjusts the brightness based on the visual observation or the measuring instrument after installation of the multi-screen display apparatus, much time is required for the measurement and the adjustment, and additionally, depending on an installation place or the number of screens, it may be difficult to make the adjustment based on the visual observation or the measuring instrument.

Moreover, the adjustment based on the visual observation may sometimes cause non-uniformity of the brightness of the large screen after the adjustment due to non-uniformity of the technique of the operator.

Furthermore, in a case where a brightness adjustment and a chromaticity correction are implemented by adjusting the level of a video signal, the level of a gradation expression in each projection type video image display apparatus of the multi-screen display apparatus after the adjustment may be impaired.

There has been also a problem that a chromaticity is not performed even if an output of a light source is adjusted by adjusting an LED activation current.

SUMMARY OF THE INVENTION

An object of the present invention is to provide a technique capable of suppressing non-uniformity of the brightness among a plurality of projection type video image display apparatuses.

The present invention is a multi-screen display apparatus having screens of a plurality of projection type video image display apparatuses arranged, wherein the plurality of projection type video image display apparatuses are connected to one another through communication means, and each of the plurality of projection type video image display apparatuses comprises a light source for three primary colors formed of a semiconductor light emitting element, and storage means for storing a brightness corresponding to a control current that is specific to each of the primary colors of the light source. Any one of the projection type video image display apparatuses determines a common target brightness based on the brightness outputtable by the any one apparatus itself and the brightnesses outputtable by other apparatuses which have been obtained through the communication means. Each of the projection type video image display apparatuses reads, as a target control current, the control current corresponding to the target brightness from the storage means, and supplies the target control current to the light source.

Any one of the plurality of projection type video image display apparatuses determines the target brightness, and each of the plurality of projection type video image display apparatuses supplies the target control current that is based on the target brightness to the light source. Accordingly, non-uniformity of the brightness among the plurality of projection type video image display apparatuses can be suppressed.

These and other objects, features, aspects and advantages of the present invention will become more apparent from the following detailed description of the present invention when taken in conjunction with the accompanying drawings.

DESCRIPTION OF THE PREFERRED EMBODIMENTS

<Preferred Embodiment 1>

Firstly, prior to a description of a multi-screen display apparatus according to a preferred embodiment 1 of the present invention, a description will be given to a multi-screen display apparatus related to the present invention.

Figure 10:
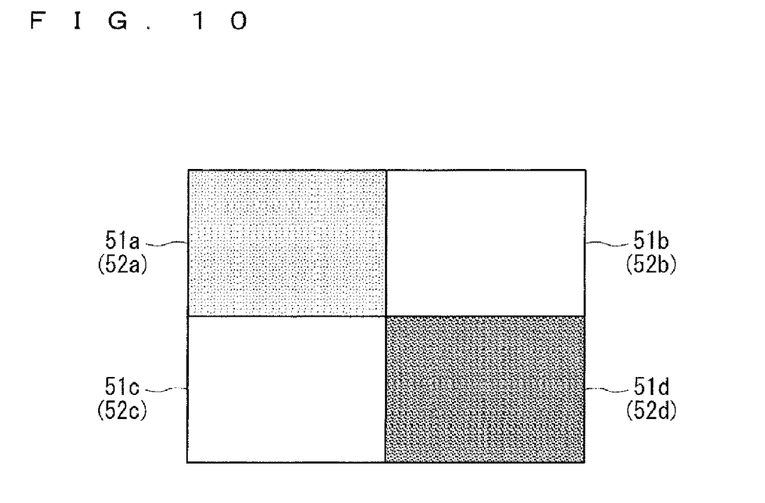
FIG. 10 is a diagram showing a configuration of a multi-screen display apparatus related to the present invention.

FIG. 10 is a diagram showing the multi-screen display apparatus related to the present invention. As shown in FIG. 10, the multi-screen display apparatus includes a plurality of (herein, four) projection type video image display apparatuses 51a to 51d each capable of projecting a video image to a screen, so that a video image can be displayed on a large screen formed by an arrangement of screens 52a to 52d.

In an initial use of such a multi-screen display apparatus, non-uniformity of the brightness may occur among the plurality of projection type video image display apparatuses 51 because of a variation during a process of manufacturing each projection type video image display apparatus 51. As a result, when each projection type video image display apparatus 51 displays white color on its enter screen 52 in accordance with a completely white video signal, a difference in the brightness is caused among the projection type video image display apparatuses 51, as shown in FIG. 10. This spoils a sense of unity of the large screen. To suppress the difference in the brightness in such a case, in the multi-screen display apparatus related to the present invention, an operator can adjust the brightness of each projection type video image display apparatus 51 based on a visual observation or by using a measuring instrument, but an operation thereof is difficult and time-consuming.

Thus, a multi-screen display apparatus according to this preferred embodiment is configured to allow the brightness of each projection type video image display apparatus to be appropriately and automatically adjusted. Hereinafter, the multi-screen display apparatus according to this preferred embodiment allowing such an adjustment will be described.

Figure 1:
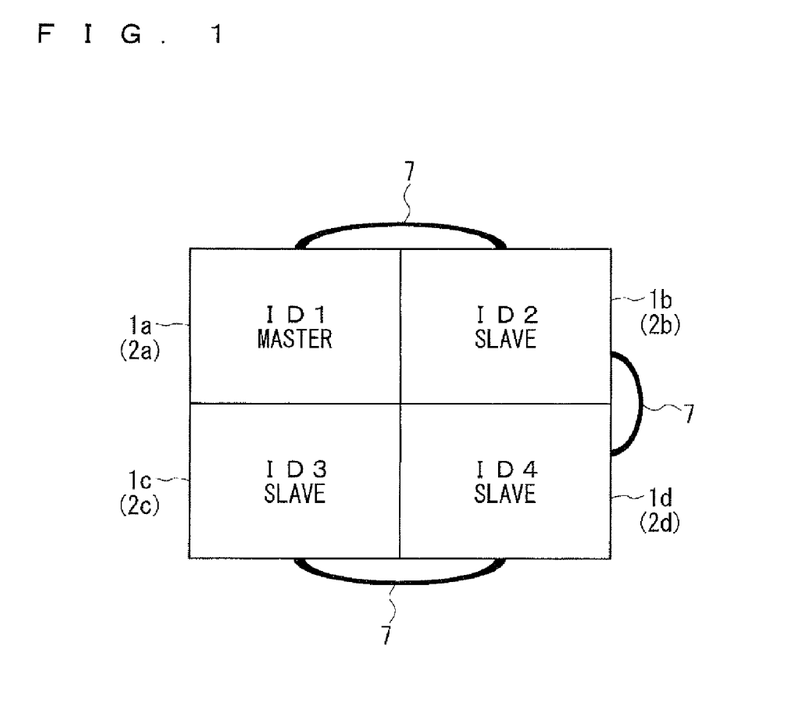
FIG. 1 is a diagram showing a configuration of a multi-screen display apparatus according to a preferred embodiment 1.

FIG. 1 is a diagram showing the multi-screen display apparatus according to this preferred embodiment. As shown in FIG. 1, this multi-screen display apparatus includes a plurality of (herein, four) projection type video image display apparatuses 1a to 1d each capable of projecting a video image to a screen, so that a video image can be displayed on a large screen formed by an arrangement of screens 2a to 2d of the plurality of projection type video image display apparatuses 1a to 1d.

In this preferred embodiment, the plurality of projection type video image display apparatuses 1 are connected to one another through a communication cable 7 that is communication means. The projection type video image display apparatuses 1 are assigned unique ID numbers not overlapping one another. A master apparatus that collectively controls the plurality of projection type video image display apparatuses 1 for the communication is given to any one of the plurality of projection type video image display apparatuses 1. Hereinafter, a description will be given based on the assumption that one projection type video image display apparatus 1a assigned an ID 1 functions as the master apparatus while the three projection type video image display apparatuses 1b to 1d assigned IDs 2 to 4 function as slave apparatuses that are collectively controlled by the master apparatus through the communication cable 7. In the following description, the projection type video image display apparatus 1a may be referred to as a "master apparatus 1a", and the projection type video image display apparatuses 1b to 1d may be referred to as "slave apparatuses 1b to 1d".

Figure 2:
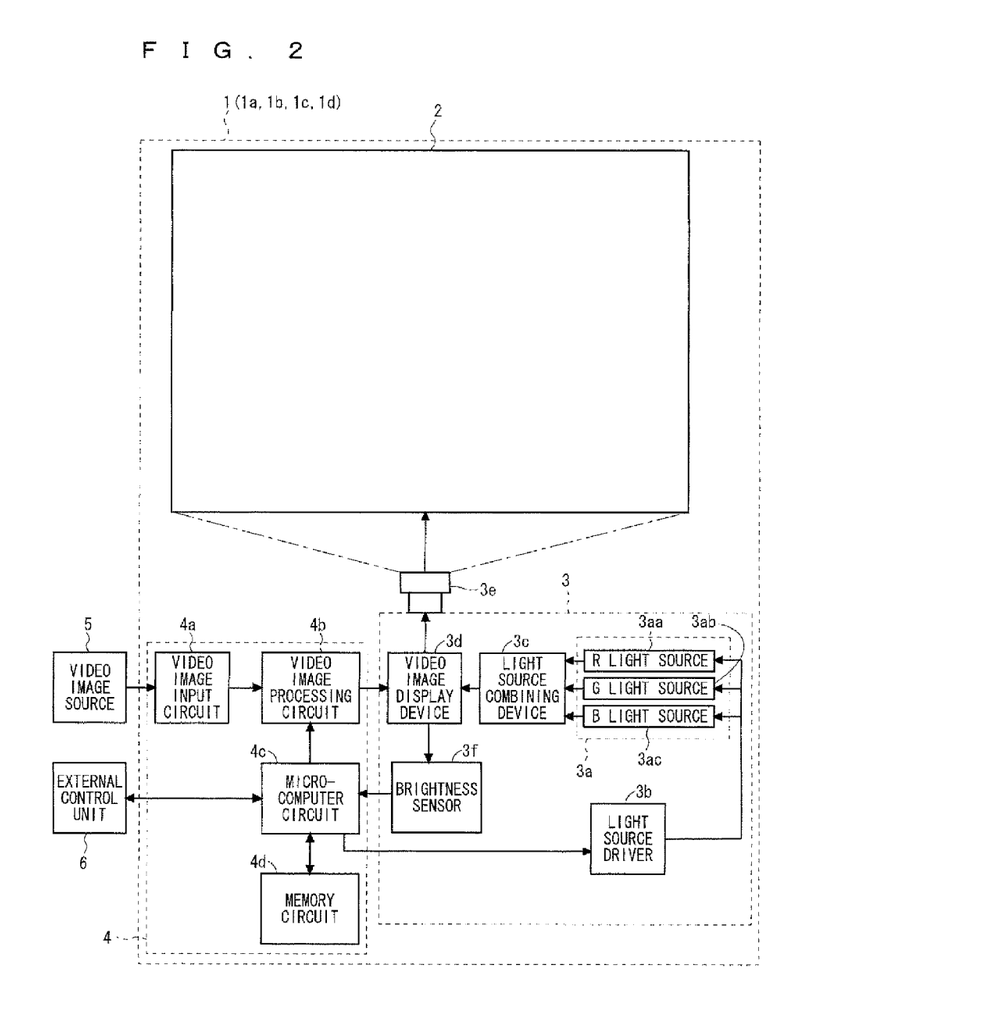
FIG. 2 is a block diagram showing a configuration of a projection type video image display apparatus according to the preferred embodiment 1.

FIG. 2 is a block diagram showing a configuration of one projection type video image display apparatus 1. Since the master apparatus 1a and the slave apparatuses 1b to 1d have substantially identical block configurations, the configuration of the projection type video image display apparatus 1 will be described without distinction between the master apparatus 1a and the slave apparatuses 1b to 1d.

As shown in FIG. 2, the projection type video image display apparatus 1 mainly includes a screen 2, a projection unit 3, and an electrical circuit unit 4. The projection unit 3 projects a video image to the screen 2 based on a video signal. The electrical circuit unit 4 supplies, to a projection unit 3, a video signal having a predetermined signal processing performed thereon. Next, each part of the configuration will be described in detail.

The electrical circuit unit 4 includes a video image input circuit 4a, a video image processing circuit 4b, a micro-computer circuit 4c, and a memory circuit 4d serving as storage means. The video image input circuit 4a receives a video signal from a video image source 5 externally provided, converts the signal into a digital-form signal, and outputs the digital video signal obtained by the conversion to the video image processing circuit 4b.

The video image processing circuit 4b adjusts an image quality of the digital video signal supplied from the video image input circuit 4a, and then performs digital-signal format conversion to convert the digital signal having the image quality thereof adjusted into a digital signal usable in the projection unit 3 (video image display device 3d). Here, the adjustment of the image quality performed by the video image processing circuit 4b will be described. The video image processing circuit 4b has a function of adjusting the image quality by raising or lowering the signal level of the three primary colors (red (hereinafter, R), green (hereinafter, G), and blue (hereinafter, B)) represented by the digital video signal, independently for each pixel on the screen and each primary color. In this preferred embodiment, the video image processing circuit 4b has an operation function of performing, on the digital video signal, a 3×3 matrix operation indicated by the following expression (1). The video image processing circuit 4b adjusts the image quality by performing this operation. Here, in the following expression (1), Ri, Gi, and Bi represent the signal levels of the R, G, and B indicated by the input signal (digital video signal supplied from the video image input circuit 4a), and RR, RG, RB, GR, GG, GB, BR, BG, and BB represent correction coefficients, and Ro, Go, and Bo represent the signal levels of the R, G, and B indicated by the video signal obtained as a result of the correction.

[Math. 1]

$$\begin{pmatrix} Ro \\ Go \\ Bo \end{pmatrix} = \begin{pmatrix} RR & GR & BR \\ RG & GG & BG \\ RB & GB & BB \end{pmatrix} \begin{pmatrix} Ri \\ Gi \\ Bi \end{pmatrix} \quad (1)$$

In this operation, for example, the signal level of Ro is obtained by raising or lowering the signal level of Ri and then adding a little of the signal levels of Gi and Bi thereto. By performing such an operation, the video image processing circuit 4b performs, as the above-mentioned function of adjusting the image quality, an adjustment of the brightness and the chromaticity (mainly an adjustment of the chromaticity) of the single color of R. In a preferred embodiment 2 which will be described later, the correction coefficient is calculated by the micro-computer circuit 4c, and the video image processing circuit 4b uses the calculated correction coefficient in the foregoing expression (1). The video image processing circuit 4b performs the above-mentioned digital-signal format conversion on the video signal obtained after the adjustment of the image quality, and outputs a resulting signal to the video image display device 3d of the projection unit 3.

The projection unit 3 includes a light source 3a, a light source driver 3b, a light source combining device 3c, a video image display device 3d, a projection lens 3e, and a brightness sensor 3f. The light source 3a is a light source of three primary colors formed of a semiconductor light emitting element such as an LED. The light source 3a is made up of an R light source 3aa for emitting a red color light, a G light source 3ab for emitting a green color light, and a B light source 5ac for emitting a blue color light. The light source driver 3*b* supplies a control current (drive current) for causing the light source 3*a* to emit a light. The light source driver 3*b* supplies the control current in a time division manner, and thereby the light emission (light output) of the light source 3*a* is controlled in a time division manner.

The light source combining device 3*c* combines the lights outputted from the light source 3*a*, and outputs a resulting light to the video image display device 3*d*. The video image display device 3*d* modulates the intensity of the light outputted from the light source combining device 3*c* based on the signal supplied from the video image processing circuit 4*b* which is obtained as a result of the digital-signal format conversion. Then, the video image display device 3*d* projects a resulting light to the screen 2 through the projection lens 3*e*. Thereby, a video image is projected to the screen 2. Examples of the video image display device 3*d* used include a DMD (Digital Mirror Device).

Figure 3:
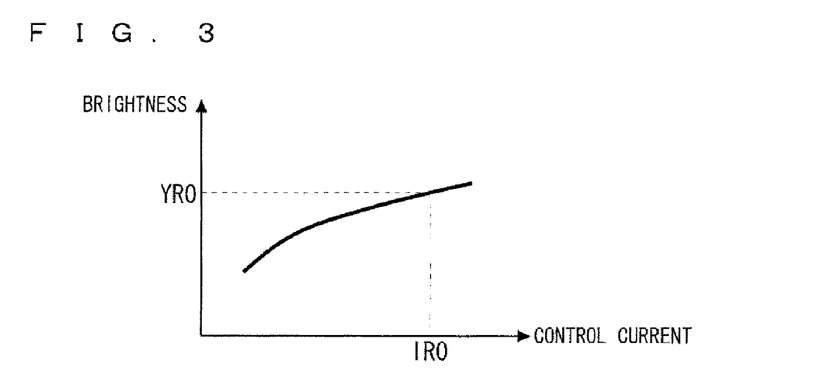
FIGS. 3 to 5 are diagrams showing the relationship between a control current and a brightness.
Figure 4:
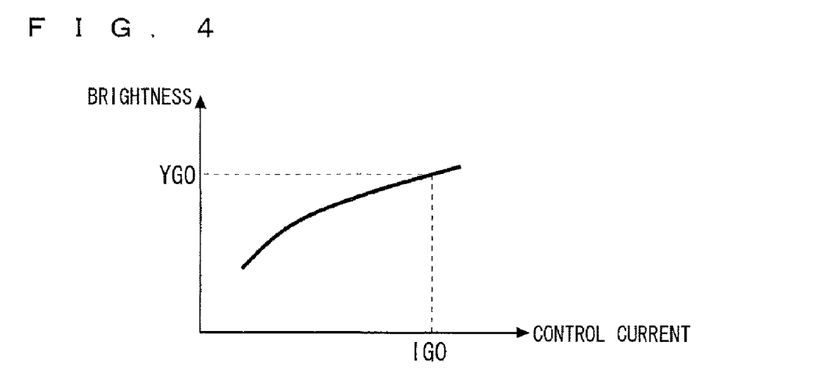
Figure 5:
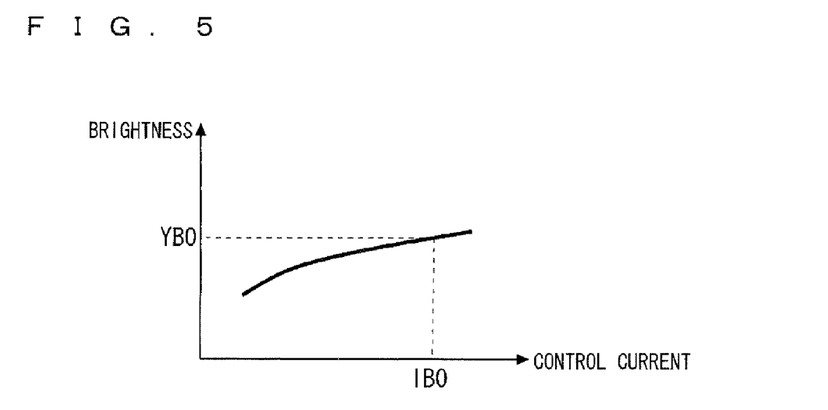

The micro-computer circuit 4*c* of the electrical circuit unit 4 collectively controls the component parts of the projection type video image display apparatus 1 based on, for example, a control signal supplied from an external control unit 6 that is arranged outside the projection type video image display apparatus 1. More specifically, the micro-computer circuit 4*c* controls, through the light source driver 3*b*, a control current value supplied to the light source 3*a*, to thereby control the brightness of the light source 3*a*. The micro-computer circuit 4*c* can write into and read from the memory circuit 4*d* various control data including a brightness value (brightness characteristics) that corresponds to the control current value for the light source 3*a* with respect to each of the R, G, and B. FIG. 3 shows the brightness value (brightness characteristics) corresponding to the control current value for the R light source 3*aa*. FIG. 4 shows the brightness value (brightness characteristics) corresponding to the control current value for the G light source 3*ab*. FIG. 5 shows the brightness value (brightness characteristics) corresponding to the control current value for the B light source 3*ac*. In this preferred embodiment, these are preliminarily stored in the memory circuit 4*d*.

The micro-computer circuit 4*c* of the master apparatus 1*a* and the micro-computer circuits 4*c* of the slave apparatuses 1*b* to 1*d* are allowed to transmit and receive information to and from one another through the communication cable 7 or a communication interface (not shown). For example, the micro-computer circuit 4*c* of the master apparatus 1*a* transmits a control command to the micro-computer circuit 4*c* of each of the slave apparatuses 1*b* to 1*d* through the communication cable 7.

The brightness sensor 3*f* of the projection unit 3 detects the amount of light (the brightness value of a video image) projected to the screen 2, and outputs a detected value to the micro-computer circuit 4*c*. In this preferred embodiment, in the projection unit 3, the brightness sensor 3*f* receives an unnecessary light not projected to the screen 2 from the video image display device 3*d*, then detects the amount of light thereof, and outputs the detected amount of light to the micro-computer circuit 4*c*. The micro-computer circuit 4*c* virtually detects (monitors) the brightness value of the video image on the screen 2 based on the amount of light. In a case where a liquid crystal video image display apparatus is adopted as the projection unit 3, the brightness value may be virtually detected based on the amount of light emitted from a backlight.

Figure 6:
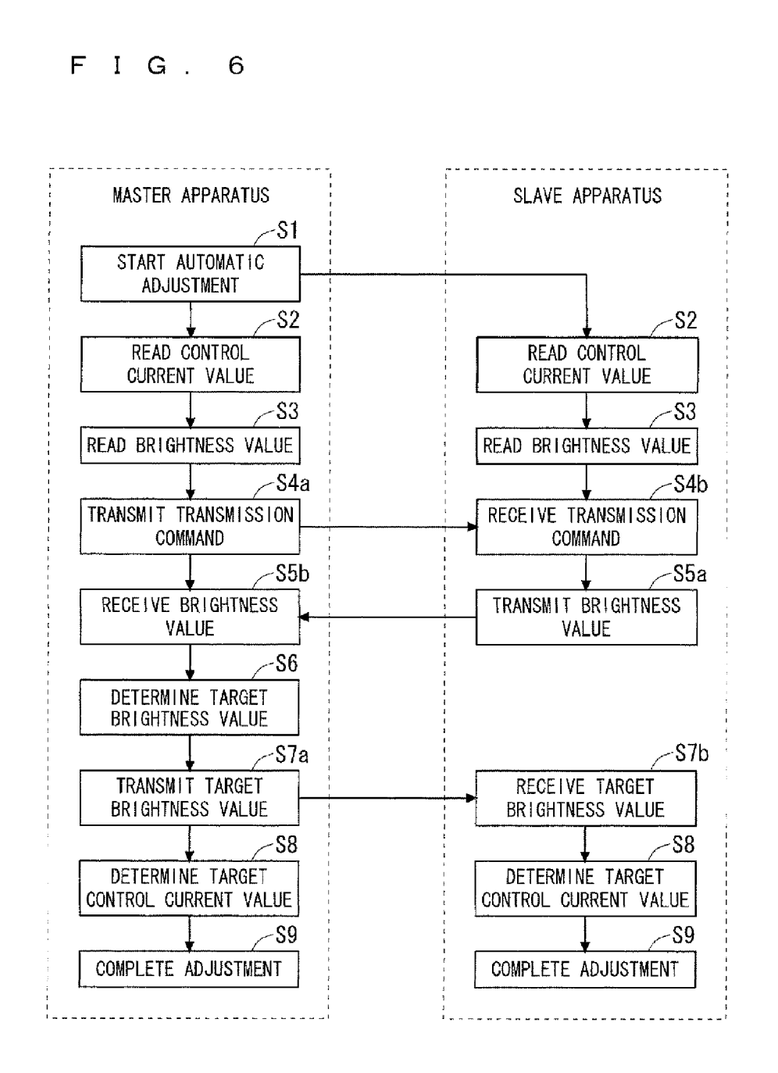
FIG. 6 is a flowchart showing an operation of the multi-screen display apparatus according to the preferred embodiment 1.

FIG. 6 is a flowchart showing an operation performed when the multi-screen display apparatus according to this preferred embodiment, after being installed, automatically performs an adjustment for suppressing non-uniformity of the brightness among the plurality of projection type video image display apparatuses 1. This operation is performed mainly by the micro-computer circuits 4*c* of the master apparatus 1*a* and the slave apparatuses 1*b* to 1*d*. Hereinafter, the operation of this multi-screen display apparatus will be described with reference to FIG. 6.

Here, it is to be noted that the following description is under the assumption that before each projection type video image display apparatus 1 was shipped from the factory, the control current value supplied to the light source 3*a* with respect to each of the R, G, and B was changed by degrees, and the brightness value on the screen 2 corresponding to each of the degrees of changing was stored in the memory circuit 4*d*. That is, the memory circuit 4*d* of each projection type video image display apparatus 1 preliminarily stores the brightness value (brightness characteristics) corresponding to the control current value that is specific to each of the three primary colors of the light source 3*a*, as shown in FIGS. 3 to 5. In the following description, the brightness value (brightness characteristics) corresponding to the control current value shown in FIGS. 3 to 5 may be sometimes referred to as "current-brightness characteristics".

In step S1 of FIG. 6, the master apparatus 1*a* transmits a command for starting an automatic adjustment to each of the slave apparatuses 1*b* to 1*d*. In step S2, the master apparatus 1*a* and the slave apparatuses 1*b* to 1*d* having received this command read an initial set value I0 (for example, I0=20A) that has been set for the control current value of each of the R, G, and B light sources. This initial set value IO may be supplied together with the command of step S1 from the master apparatus 1*a* to the slave apparatuses 1*b* to 1*d*, or may be preliminarily stored in the memory circuits 4*d* of the master apparatus 1*a* and the slave apparatuses 1*b* to 1*d*.

In step S3, the master apparatus 1*a* and the slave apparatuses 1*b* to 1*d* read their own outputtable brightness values. In this preferred embodiment, the master apparatus 1*a* and the slave apparatuses 1*b* to 1*d* reads, as their own outputtable brightness values, the brightness values of the R, G, and B on the light sources 3*a* corresponding to the initial set value IO, from the current-brightness characteristics (FIGS. 3 to 5) stored in the memory circuit 4*d*. That is, the master apparatus 1*a* and the slave apparatuses 1*b* to 1*d* read a brightness value YR0n obtained when the control current of the R light source 3*aa* is IRn (IRn=I0), a brightness value YG0n obtained when the control current of the G light source 3*ab* is IGn (IGn=I0), and a brightness value YB0n obtained when the control current of the B light source 3*ac* is IBn (IBn=I0).

Here, n is a natural number assigned to each projection type video image display apparatus 1. The value corresponding to n=1 means, for example, a value read or calculated by the master apparatus 1*a*. The value corresponding to n=2 means, for example, a value read or calculated by the slave apparatus 1*b*. Likewise, a value corresponding to n=3 means, for example, a value read or calculated by the slave apparatus 1*c*. The value corresponding to n=4 means, for example, a value read or calculated by the slave apparatus 1*d*.

In step S4*a*, the master apparatus 1*a* transmits a transmission command to each of the slave apparatuses 1*b* to 1*d* through the communication cable 7. The transmission command is for causing the slave apparatuses 1*b* to 1*d* to transmit the brightness values YR0n, YG0n, and YB0n (n=2 to 4) that have been read, In step S4*b*, each of the slave apparatuses 1*b* to 1*d* receives the transmission command from the master apparatus 1*a*.

In step S5*a*, each of the slave apparatuses 1*b* to 1*d* transmits the brightness values YR0n, YG0n, and YB0n (n=2 to 4) that have been read to the master apparatus 1*a* through the communication cable 7. In step S5b, the master apparatus 1a receives the brightness values from each of the slave apparatuses 1b to 1d.

In step S6, the master apparatus 1a determines target brightness values that are commonly outputtable by the apparatuses, based on the outputtable brightness values YR0n, YG0n, and YB0n (n=1) of the master apparatus 1a itself and the outputtable brightness values YR0n, YG0n, and YB0n (n=2 to 4) of the other apparatuses (slave apparatuses 1b to 1d) that have been received through the communication cable 7. In this preferred embodiment, the master apparatus 1a sets the target brightness YRT to be YRT=Min (YR01, YR02, YR03, and YR04), sets the target brightness YGT to be YGT=Min (YG01, YG02, YG03, and YG04), and the target brightness YBT to be YBT=Min (YB01, YB02, YB03, and YB04). That is, with respect to each set of the R, G, and B, the master apparatus 1a determines the target brightness values YRT, YGT, and YBT to be the smallest one of the brightness values among the outputtable brightness value of the master apparatus 1a itself and the outputtable brightness values of the other apparatuses.

In step S7a, the master apparatus 1a transmits the determined target brightness values YRT, YGT, and YBT to each of the slave apparatuses 1b to 1d through the communication cable 7. In step S7b, each of the slave apparatuses 1b to 1d receives the target brightness values from the master apparatus 1a.

In step S8, the master apparatus 1a and the slave apparatuses 1b to 1d read, as target control current values, control current values IRTn (n=1 to 4), IGTn (n=1 to 4), and IBTn (n=1 to 4) corresponding to the target brightness values YRT, YGT, and YBT, from the current-brightness characteristics (FIGS. 3 to 5) stored in the memory circuit 4d.

Then, in step S8, the master apparatus 1a and the slave apparatuses 1b to 1d set the target control current values IRTn (n=1 to 4), IGTn (n=1 to 4), and IBTn (n=1 to 4) to the light source driver 3b, to thereby supply the target control current values to the light source 3a. In other words, the master apparatus 1a and the slave apparatuses 1b to 1d change the control current values to be supplied to the light source 3a, based on the target brightness value.

In step S9, the above-described brightness adjustment is completed.

In the above-described multi-screen display apparatus according to this preferred embodiment, any one of the plurality of projection type video image display apparatuses 1 determines the target brightness, and each of the plurality of projection type video image display apparatuses 1 supplies the target control current based on this target brightness to the light source 3a. Accordingly, non-uniformity of the brightness among the plurality of projection type video image display apparatuses 1 can be suppressed. This can improve a sense of unity of the multi-screen display apparatus.

In the multi-screen display apparatus according to this preferred embodiment, the projection type video image display apparatus 1a determines the target brightness to be the smallest one of the brightness values among the outputtable brightness value of itself and the outputtable brightness values of other apparatuses. As a result, the control current as low as possible is used, and therefore the power consumption can be reduced.

In addition, the brightness value adjustment based on the control current as adopted in this preferred embodiment can increase the possibility of lowering the control current and thus can increase the expectation for reduction of the power consumption, as compared with the brightness value adjustment based on an image quality adjustment value in the video image processing circuit 4b.

However, for obtaining the effect of suppressing non-uniformity of the brightness, it is not essential that the projection type video image display apparatus 1a determines the target brightness to be the smallest one of the brightness values. Accordingly, any determination method other than the above-described one may be useful to suppress non-uniformity of the brightness, as long as a common brightness value outputtable by the projection type video image display apparatuses 1a to 1d is determined as the target brightness.

In this preferred embodiment, the description has been given under the assumption that the memory circuit 4d stores the current-brightness characteristics shown in FIG. 3 and the like, as the brightness value corresponding to the control current value. The current-brightness characteristics stored in the memory circuit 4d may be in the form of a correspondence table associating the control current with the brightness value, or may be in the form of a relational expression concerning the control current and the brightness characteristics. In the former case, reading of the brightness value is easy, while in the latter case, a storage capacity of the memory circuit 4d can be reduced.

In this preferred embodiment, in step S2, the master apparatus 1a and the slave apparatuses 1b to 1d read, as their own outputtable brightness values, the brightness values of the R, G, and B light sources corresponding to the initial set value J0, from the memory circuit 4d. However, in a case where their own outputtable brightness values are known, the outputtable brightness values may be stored in the memory circuit 4d and when performing step S2, the outputtable brightness values may be read. In such a case, the operation is simplified, and additionally the storage capacity of the memory circuit 4d can be reduced.

<Preferred Embodiment 2>

In the preferred embodiment 1, non-uniformity of the brightness among the plurality of projection type video image display apparatuses 1 is suppressed. Here, it is considered that there is some non-uniformity of the chromaticity in the multi-screen display apparatus according to the preferred embodiment 1, because a chromaticity value (chromaticity characteristics) of an LED corresponding to the control current value varies among LEDs due to a variation during a manufacturing process and additionally in the preferred embodiment 1, the control current value is not determined in consideration of the chromaticity. Therefore, a multi-screen display apparatus according to a preferred embodiment 2 of the present invention can suppress not only non-uniformity of the brightness but also non-uniformity of the chromaticity. Hereinafter, the multi-screen display apparatus according to this preferred embodiment will be described with a focus on parts different from the preferred embodiment 1. The component parts identical to those of the preferred embodiment 1 are denoted by the identical reference numerals.

Figure 7:
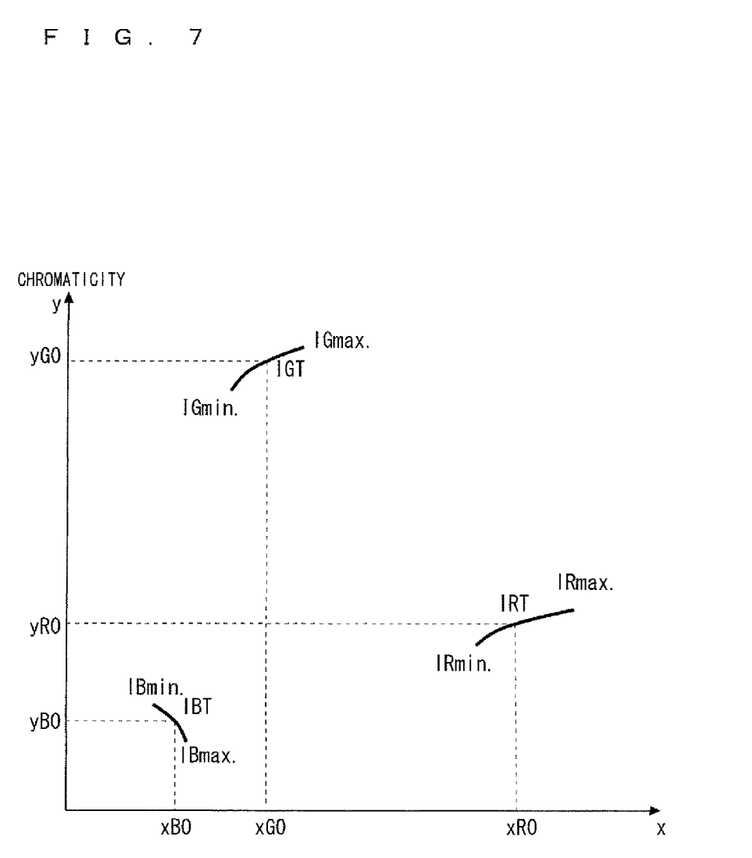
FIG. 7 is a diagram showing the relationship between the control current and a chromaticity.

In this preferred embodiment, a micro-computer circuit 4c can write into and read from the memory circuit 4d various control data including not only the above-described current-brightness characteristics but also a chromaticity value (chromaticity characteristics) corresponding to the control current value of each of the R, G, and B light sources 3a, and an image quality adjustment value (that is, the correction coefficient of the foregoing expression (1)) of the RGB brightness chromaticity in the video image processing circuit 4b. FIG. 7 shows chromaticity values (chromaticity characteristics) corresponding to the control current values for the R, G, and B light sources 3a. In this preferred embodiment, these values are preliminarily stored in the memory circuit 4d. A coordinate system shown in FIG. 7 corresponds to the CIE color system, and the y-axis represents the brightness.

Figure 8:
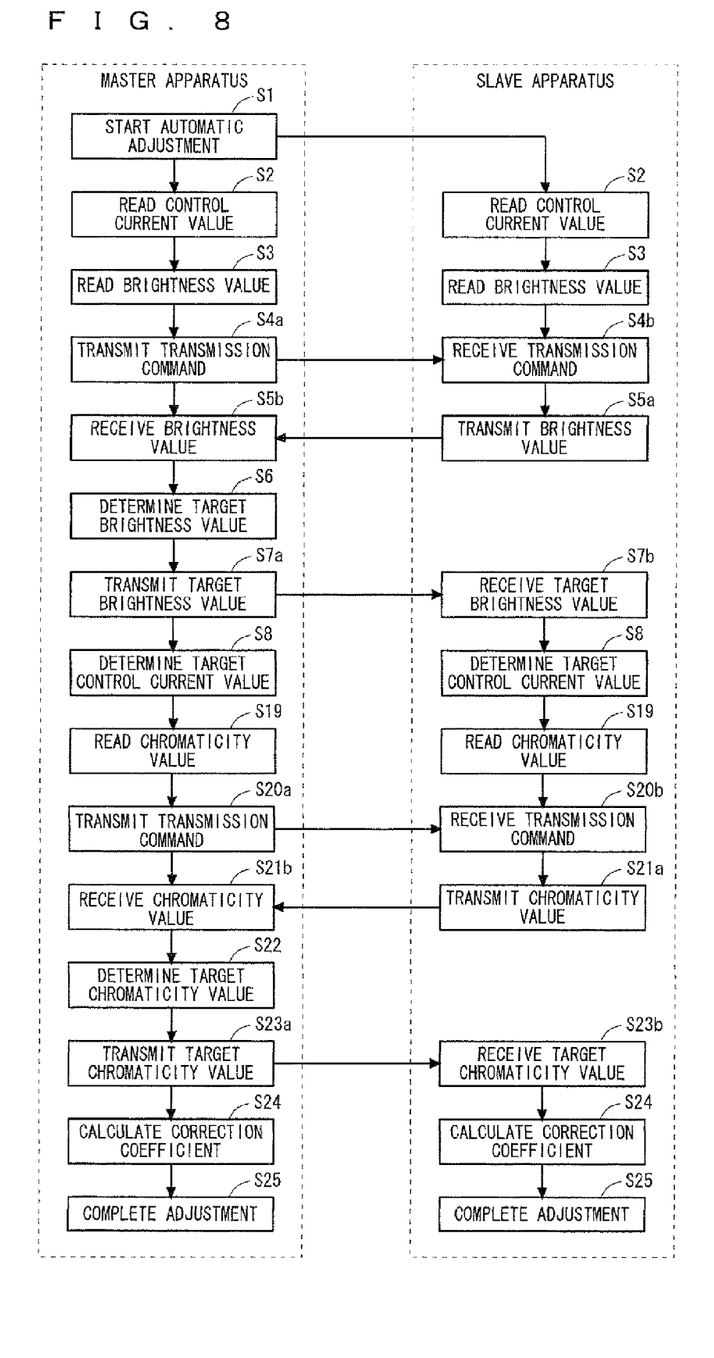
FIG. 8 is a flowchart showing an operation of a multi-screen display apparatus according to a preferred embodiment 2.

FIG. 8 is a flowchart showing an operation performed when the multi-screen display apparatus according to this preferred embodiment, after being installed, automatically performs an adjustment (correction) for suppressing non-uniformity of the brightness and the chromaticity among the plurality of projection type video image display apparatuses 1. This operation is performed mainly by the micro-computer circuits 4c of the master apparatus 1a and the slave apparatuses 1b to 1d. Hereinafter, the operation of this multi-screen display apparatus will be described with reference to FIG. 8.

Here, it is to be noted that the following description is under the assumption that before each projection type video image display apparatus 1 was shipped from the factory, the control current value supplied to the light source 3a with respect to each of the R, G, and B was changed by degrees, and the brightness value (brightness characteristics) and the chromaticity value (chromaticity characteristics) on the screen 2 corresponding to each of the degrees of changing were stored in the memory circuit 4d. That is, the memory circuit 4d of each projection type video image display apparatus 1 preliminarily stores not only the above-described current-brightness characteristics but also the chromaticity value (chromaticity characteristics) corresponding to the control current value that is specific to each of the three primary colors of the light source 3a, as shown in FIG. 7. In the following description, the chromaticity value (chromaticity characteristics) corresponding to the control current value shown in FIG. 7 may be sometimes referred to as "current-chromaticity characteristics".

In steps S1 to step S8 of FIG. 7, the same operations as the operation of steps S1 to step S8 described in the preferred embodiment 1 are performed.

Then, in step S19, the master apparatus 1a and the slave apparatuses 1b to 1d read, from the current-chromaticity characteristics (FIG. 7) stored in the memory circuit 4d, chromaticity values xR0n and yR0n (n=1 to 4) corresponding to the target control current value IRTn (n=1 to 4) for the R light source 3aa that has been read in step S8. In the same manner, the master apparatus 1a and the slave apparatuses 1b to 1d read chromaticity values xG0n and yG0n (n=1 to 4) corresponding to the target control current value IGTn (n=1 to 4) for the G light source 3ab that has been read in step S8. In the same manner, the master apparatus 1a and the slave apparatuses 1b to 1d read the chromaticity values xB0n and yB0n (n=1 to 4) corresponding to the target control current value IBTn (n=1 to 4) for the B light source 3ac that has been read in step S8.

In step S20a, the master apparatus 1a transmits a transmission command to each of the slave apparatuses 1b to 1d through the communication cable 7. The transmission command is for causing the slave apparatuses 1b to 1d to transmit the chromaticity values xR0n, yR0n, xG0n, yG0n, xB0n, and yB0n (n=2 to 4) that have been read. In step S20b, each of the slave apparatuses 1b to 1d receives the transmission command from the master apparatus 1a.

In step S21a, each of the slave apparatuses 1b to 1d transmits the chromaticity values xR0n, yR0n, xG0n, yG0n, xB0n, and yB0n (n=2 to 4) that have been read to the master apparatus 1a through the communication cable 7. In step S21b, the master apparatus 1a receives the chromaticity values from each of the slave apparatuses 1b to 1d.

In step S22, the master apparatus 1a determines target chromaticity values that are commonly reproducible by these apparatuses, based on the above-mentioned chromaticity values corresponding to the target control current values IRTn, IGTn, and IBTn (n=1) of the master apparatus 1a itself and the above-mentioned chromaticity values corresponding to the target control current values IRTn, IGTn, and IBTn (n=2 to 4) of other apparatuses (slave apparatuses 1b to 1d) that have been transmitted through the communication cable 7.

Figure 9:
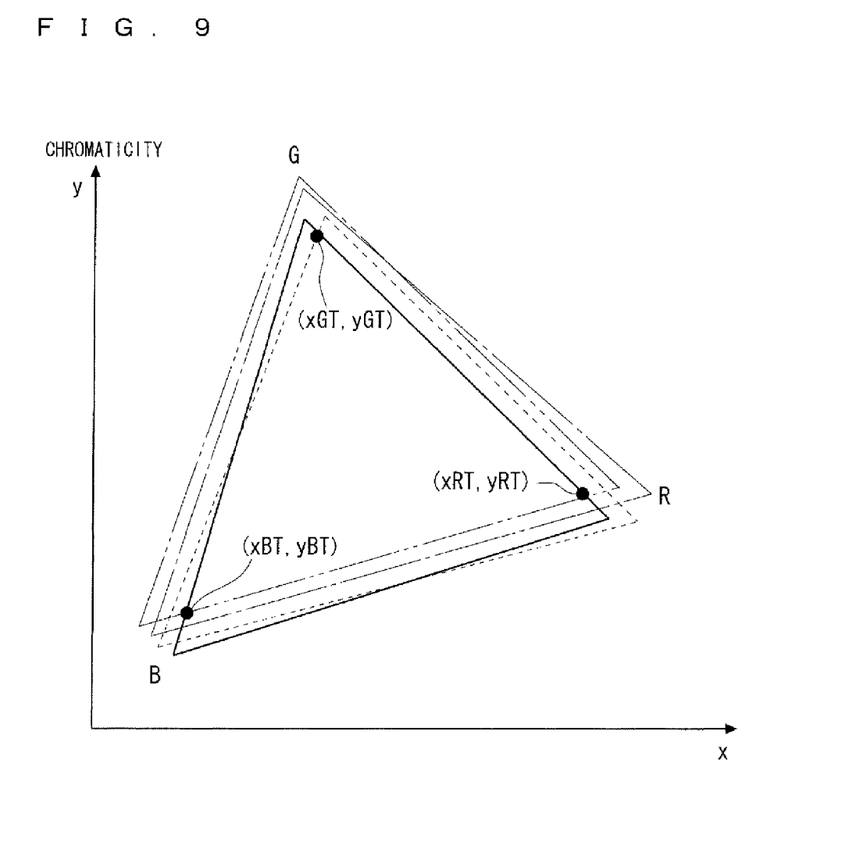
FIG. 9 is a diagram showing a determination of a target chromaticity in a master apparatus according to the preferred embodiment 2.

FIG. 9 is a diagram showing an operation performed when the master apparatus 1a determines the target chromaticity value in step S22. In FIG. 9, for example, the solid line, the dotted line, the alternate long and short dash line, and the alternate long and two short dashes line correspond to the four apparatuses, namely, the master apparatus 1a and the slave apparatuses 1b to 1d. Each of the lines defines a triangle whose vertices correspond to the chromaticity values xR0n and yR0n, the chromaticity values xG0n and yG0n, and the chromaticity values xB0n and yB0n (n=1 to 4). In this case, the master apparatus 1a determines three points that exist within a region where all of the four triangles overlap and that are located near the vertices of these triangles, as the target chromaticity values xRT and yRT, the target chromaticity values xGT and yGT, and the target chromaticity values xBT and yBT.

In step S23a, the master apparatus 1a transmits the determined target chromaticity values xRT, yRT, xGT, yGT, xBT, and yBT to each of the slave apparatuses 1b to 1d through the communication cable 7. In step S23b, each of the slave apparatuses 1b to 1d receives the target chromaticity values from the master apparatus 1a.

Prior to proceeding to step S24, the master apparatus 1a and the slave apparatuses 1b to 1d apply, to the following expression (2), the target brightness values YRT, YGT, and YBT that have been read in step S6 and the chromaticity values xR0n, yR0n, xG0n, yG0n, xB0n, and yB0n (n=1 to 4) that have been read in step S19, to calculate tristimulus values XR0n, ZR0n, XG0n, ZG0n, XB0n, and ZB0n (n=1 to 4) for the R, G, and B.

[Math. 2]

$$xR0n = XR0n/(XR0n + YRT + ZR0n)$$

$$yR0n = YRT/(XR0n + YRT + ZR0n)$$

$$xG0n = XG0n/(XG0n + YGT + ZG0n)$$

$$yG0n = YGT/(XG0n + YGT + ZG0n)$$

$$xB0n = XB0n/(XB0n + YBT + ZB0n)$$

$$yB0n = YBT/(XB0n + YBT + ZB0n) \quad (2)$$

In addition, prior to proceeding to step S24, the master apparatus 1a and the slave apparatuses 1b to 1d apply, to the following expression (3) that is substantially identical to the foregoing expression (2), the target brightness values YRT, YGT, and YBT that have been read in step S6 and the target chromaticity values xRT, yRT, xGT, yGT, xBT, and yBT that have been determined in step S22, to thereby calculate tristimulus values XRT, ZRT, XGT, ZGT, XBT, and ZBT for the R, G, and B, which serve as the target.

[Math. 3]

$$xRT = XRT/(XRT + YRT + ZRT)$$

$$yRT = YRT/(XRT + YRT + ZRT)$$

$$xGT = XGT/(XGT + YGT + ZGT)$$

$$yGT = YGT/(XGT + YGT + ZGT)$$

$$xBT=XBT/(XBT+YBT+ZRT)$$

$$yBT=YBT/(XBT+YBT+ZBT) \quad (3)$$

The tristimulus values Xn, Yn, and Zn (n=1 to 4) for the input video signals Ri, Gi and Bi of the projection type video image display apparatus is represented by the following expression (4). Based on the expression (4) and the foregoing expression (1), the following expression (5) is obtained.

[Math. 4]

$$\begin{pmatrix} Xn \\ Yn \\ Zn \end{pmatrix} = \begin{pmatrix} XROn & XGOn & XBOn \\ YRT & YGT & YBT \\ ZROn & ZGOn & ZBOn \end{pmatrix} \begin{pmatrix} Ri \\ Gi \\ Bi \end{pmatrix} \quad (4)$$

[Math. 5]

$$\begin{pmatrix} XRT & XGT & XBT \\ YRT & YGT & YBT \\ ZRT & ZGT & ZBT \end{pmatrix} = \quad (5)$$

$$\begin{pmatrix} XROn & XGOn & XBOn \\ YRT & YGT & YBT \\ ZROn & ZGOn & ZBOn \end{pmatrix} \begin{pmatrix} RRn & GRn & BRn \\ RGn & GGn & BGn \\ RBn & GBn & BBn \end{pmatrix}$$

In step S24, the master apparatus 1a and the slave apparatuses 1b to 1d apply, to the expression (5), the target brightness values YRT, YGT, and YBT that have been read in step S6, the tristimulus values XR0n, ZR0n, XG0n, ZG0n, XB0n, and ZB0n (n=1 to 4) for the R, G, and B, that have been calculated prior to step S24, and the tristimulus values XRT, ZRT, XGT, ZGT, XBT, and ZBT for the R, G, and B, that have been calculated prior to step S24 and that serve as the target. Then, based on the expression resulting from this application, the master apparatus 1a and the slave apparatuses 1b to 1d calculate correction coefficients RRn, RGn, RBn, GRn, GGn, GBn, BRn, BGn, and BBn (n=1 to 4). In other words, the master apparatus 1a and the slave apparatuses 1b to 1d calculate the correction coefficients for correcting the level of the video signal inputted to theirselves, based on the target chromaticity value mentioned above.

In step S25, the master apparatus 1a and the slave apparatuses 1b to 1d make settings such that the video image processing circuit 4b can use the calculated correction coefficients.

In the multi-screen display apparatus according to this preferred embodiment, the same operation as that of the preferred embodiment 1 is performed. Therefore, non-uniformity of the brightness among the plurality of projection type video image display apparatuses 1 can be suppressed. In the multi-screen display apparatus according to this preferred embodiment, any one of the plurality of projection type video image display apparatuses 1 determines the target chromaticity, and, based on the target chromaticity, each of the plurality of projection type video image display apparatuses 1 calculates the correction coefficient for correcting the level of the video signal. Accordingly, non-uniformity of the chromaticity among the plurality of projection type video image display apparatuses 1 can be suppressed, too.

In general, in a case where both of the brightness adjustment and the chromaticity correction are implemented only by correcting the level of the video signal, the level of a gradation expression in each projection type video image display apparatus 1 may be impaired. In the preferred embodiment, on the other hand, non-uniformity of the brightness is suppressed by adjusting the control current value, while non-uniformity of the chromaticity is suppressed by correcting the level of the video signal. This can reduce the impairing of a digital representation of the tone of the video signal displayed on the screen. Therefore, the preferred embodiment is particularly effective in displaying a video image having many intermediate tones, such as a natural picture.

While the invention has been shown and described in detail, the foregoing description is in all aspects illustrative and not restrictive. It is therefore understood that numerous modifications and variations can be devised without departing from the scope of the invention.

What is claimed is:

1. A system comprising a plurality of projection type video image display apparatuses whose screens are arranged as a multi-screen display apparatus, wherein
   said plurality of projection type video image display apparatuses are connected to one another through communication means,
   each of said plurality of projection type video image display apparatuses comprises a light source for three primary colors formed of a semiconductor light emitting element, and storage means for storing a brightness corresponding to a control current that is specific to each of the primary colors of said light source,
   a particular one of said projection type video image display apparatuses obtains said brightnesses outputtable by the others of said projection type video image display apparatuses via said communication means, and determines a common target brightness based on said brightness outputtable by said particular one of said projection type video image display apparatuses itself and said brightnesses outputtable by said others of said projection type video image display apparatuses which have been obtained through said communication means, said particular one of said projection type video image display apparatuses sending said common target brightness to said others of said projection type video image display apparatuses via said communication means, and
   each of said projection type video image display apparatuses reads, as a target control current, said control current corresponding to said common target brightness from said storage means, and supplies said target control current to said light source.

2. The system according to claim 1, wherein
   said storage means of each of said projection type video image display apparatuses also stores a chromaticity corresponding to said control current that is specific to each of the primary colors of said light source,
   said particular one of said projection type video image display apparatuses determines a common target chromaticity based on said chromaticity corresponding to said target control current of said particular one of said projection type video image display apparatuses itself and said chromaticity corresponding to said target control currents of said others of said projection type video image display apparatuses which have been obtained through said communication means,
   each of said projection type video image display apparatuses calculates a correction coefficient for correcting a level of a video signal inputted to the apparatus itself, based on said common target chromaticity.

3. The system according to claim 1, wherein
   said particular one of said projection type video image display apparatuses determines said target brightness to be the smallest one of said brightness outputtable by said particular one of said projection type video image display apparatuses itself and said brightnesses outputtable by said others of said projection type video image display apparatuses.

4. The system according to claim 1, wherein said plurality of projection type video image display apparatuses comprises:
- one projection type video image display apparatus functioning as a master apparatus; and
- a plurality of projection type video image display apparatuses other than said one projection type video image display apparatus, functioning as slave apparatuses that are collectively controlled by said master apparatus through said communication means, said master apparatus is said particular one of said projection type video image display apparatuses which determines said common target brightness.

5. The system according to claim 1, wherein each of said projection type video image display apparatuses reads from its own storage means a specific value of the brightness that corresponds to a common initial-set value of the control currents for each of said projection type video image display apparatuses as said brightness outputtable by each of said projection type video image display apparatuses.

* * * * *